(12) United States Patent
Singh et al.

(10) Patent No.: US 10,437,543 B2
(45) Date of Patent: Oct. 8, 2019

(54) DISPLAY CONTROL APPARATUS AND METHOD

(71) Applicant: Jaquar Land Rover Limited, Coventry, Warwickshire (GB)

(72) Inventors: Harpreet Singh, Coventry (GB); Elvir Hasedzic, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 76 days.

(21) Appl. No.: 15/552,758

(22) PCT Filed: Feb. 19, 2016

(86) PCT No.: PCT/EP2016/053546
§ 371 (c)(1),
(2) Date: Aug. 22, 2017

(87) PCT Pub. No.: WO2016/135060
PCT Pub. Date: Sep. 1, 2016

(65) Prior Publication Data
US 2018/0032300 A1 Feb. 1, 2018

(30) Foreign Application Priority Data
Feb. 23, 2015 (GB) .................................. 1503001.8

(51) Int. Cl.
*G06F 3/14* (2006.01)
*B60K 35/00* (2006.01)
(Continued)

(52) U.S. Cl.
CPC ............ *G06F 3/1423* (2013.01); *B60K 35/00* (2013.01); *B60Q 9/00* (2013.01); *G06F 3/013* (2013.01);
(Continued)

(58) Field of Classification Search
CPC ........ G06F 3/1423; G06F 3/013; G06F 3/016; B60K 35/00; B60K 2350/1068;
(Continued)

(56) References Cited

U.S. PATENT DOCUMENTS

2012/0215403 A1 8/2012 Tengler et al.
2013/0097557 A1* 4/2013 Madau .................... A61B 5/18
715/810

(Continued)

FOREIGN PATENT DOCUMENTS

CN 102343819 A 2/2012
CN 103661374 A 3/2014
(Continued)

OTHER PUBLICATIONS

Patents Act 1977: Combined Search and Examination Report under Sections 17 and 18(3), GB Application No. GB1503001.8, dated Jul. 28, 2015, 6 pp.
(Continued)

*Primary Examiner* — Ariel A Balaoing
(74) *Attorney, Agent, or Firm* — Myers Bigel, P.A.

(57) ABSTRACT

The invention relates to a display control apparatus (1) for dynamically controlling the display of information in a vehicle (3). The display control apparatus (1) comprises a controller (12) having at least one electronic processor (13). The at least one electronic processor (13) is configured to control first and second displays (4, 5). In dependence on a determined gaze direction of the vehicle driver, the at least one electronic processor (13) controls a switching module (16) to cause a first information data set (INF1) displayed on said first display (4) to be displayed on said second display (5). The present invention also relates to a method of controlling the display of information in a vehicle (3). One aim is to shift the driver's view back to the road.

17 Claims, 3 Drawing Sheets

(51) Int. Cl.
*B60Q 9/00* (2006.01)
*G06F 3/01* (2006.01)

(52) U.S. Cl.
CPC .. *B60K 2370/149* (2019.05); *B60K 2370/152* (2019.05); *B60K 2370/155* (2019.05); *B60K 2370/184* (2019.05); *B60K 2370/31* (2019.05); *B60K 2370/334* (2019.05); *B60K 2370/52* (2019.05); *B60K 2370/774* (2019.05); *G06F 3/016* (2013.01)

(58) Field of Classification Search
CPC .... B60K 2350/0935; B60K 2350/1072; B60K 2350/2065; B60K 2350/106; B60K 2350/352
See application file for complete search history.

(56) References Cited

U.S. PATENT DOCUMENTS

| 2013/0222212 A1 | 8/2013 | Lorenz et al. |
| 2014/0211319 A1 | 7/2014 | Park et al. |
| 2015/0015479 A1* | 1/2015 | Cho ................. G06F 3/013 345/156 |

FOREIGN PATENT DOCUMENTS

| DE | 10 2006 050 016 A1 | 4/2008 |
| DE | 10 2010 041 961 A1 | 4/2012 |
| DE | 10 2011 084 887 A1 | 4/2013 |
| DE | 10 2013 010 019 B3 | 10/2014 |
| EP | 2 826 689 A2 | 1/2015 |

OTHER PUBLICATIONS

International Search Report and Written Opinion of the International Searching Authority, International Application No. PCT/EP2016/053546, dated Apr. 29, 2016, 15 pp.

Patents Act 1977: Combined Search and Examination Report under Sections 17 and 18(3), UKIPO Application No. GB1813515.2, dated Jan. 14, 2019, 5 pp.

First Office Action and English language translation, CN Application No. 201680011289.4, dated Dec. 5, 2018, 21 pp.

* cited by examiner

FIG. 3

DISPLAY CONTROL APPARATUS AND METHOD

RELATED APPLICATIONS

This application is a 35 U.S.C. § 371 national stage application of PCT Application No. PCT/EP2016/053546, filed on Feb. 19, 2016, which claims priority from Great Britain Patent Application No. 1503001.8, filed on Feb. 23, 2015, the contents of which are incorporated herein by reference in their entireties. The above-referenced PCT International Application was published in the English language as International Publication No. WO 2016/135060 A1 on Sept. 1, 2016.

TECHNICAL FIELD

The present disclosure relates to a display control apparatus and method. More particularly, but not exclusively, the present disclosure relates to a display control apparatus for dynamically controlling the display of information in a vehicle; to a vehicle incorporating a display control apparatus; and to a method of dynamically controlling the display of information in a vehicle.

BACKGROUND

It is known in automotive applications to provide a fixed display of information for the driver. The information can for example, be output to the driver in via one or more displays in the occupant compartment of a vehicle. The displays used in vehicles include High Level Display Front (HLDF), head-up displays (HUD), and instrument cluster displays. A shortcoming of known techniques is that the driver has to look at a particular screen which may mean that they look away from the road. Certain tasks, such as tuning the radio or selecting a navigation route, require attention from the driver and in certain instances this may prove distracting. This problem can be compounded if the information is displayed on a screen positioned away from the windshield, for example in a centre console.

It is against this background that the present invention has been conceived. At least in certain embodiments, the present invention seeks to overcome or ameliorate certain problems associated with the prior art systems.

SUMMARY OF THE INVENTION

Aspects and embodiments of the present invention relate to a display control apparatus for dynamically controlling the display of information in a vehicle; to a vehicle incorporating a display control apparatus; and to a method of dynamically controlling the display of information in a vehicle.

According to a further aspect of the present invention there is provided a display control apparatus for dynamically controlling the display of information in a vehicle. The display control apparatus may comprise a controller having at least one electronic processor. The at least one electronic processor may be configured to control first and second displays. In dependence on a determined gaze direction of the vehicle driver, the at least one electronic processor may be configured to control a switching module to cause a first information data set displayed on said first display to be displayed on said second display.

At least in certain embodiments, the display control apparatus is responsive to driver behaviour and controls the display of information based on the determined gaze direction of the driver. The display control apparatus can provide a multi-modal system integrating gaze detection and display interface controls. The display control apparatus may be operative to manage the display of information within the vehicle in dependence on the gaze direction of the vehicle driver. A traditional display manager displays information in a fixed location (or locations) within the vehicle. However, the display control apparatus in accordance with the present invention allows a dynamic display of information within the vehicle, for example based on the priority of information, driver preferences (for example based on historic driver inputs), and driver workload etc. The display control apparatus can thereby tailor the display of information to a particular situation.

By providing dynamic control of the display of information, the display control apparatus can correlate the location where information is displayed to reflect driver behaviour. For example, if the first information data set is displayed on the first display and the display control apparatus determines that the driver is not looking at the first display, the switching module can be operated to display the first information data set on the second display. The transfer of the first information data set can be performed seamlessly to move or duplicate the first information data set on the second display.

The at least one electronic processor can be configured to control the switching module to display the first information data set on said second display in dependence on identifying that the determined gaze direction is directed at the first display. The switching module can be controlled to display the first information data set on said second display when the determined gaze direction is directed at the first display for a predetermined period of time; and/or when the determined gaze direction is directed at the first display repeatedly within a predetermined period of time.

The at least one electronic processor can be configured to control the switching module in dependence on one of: priority of information; driver preferences; a determined driver workload; and a criticality level defined for said first information data set. If the driver workload is determined to be high, the display control apparatus can be configured to inhibit operation of the switching module; and/or to return the first information data set to said first display.

The at least one electronic processor can be configured to transfer the first information data set displayed on said first display from said first display to said second display. A notification, such as a message, graphical symbol or an icon, could optionally be displayed on the first display to indicate that the first information data set has been transferred to the second display. Alternatively, the at least one electronic processor can be configured to duplicate the first information data set displayed on said first display on said second display. A notification, such as a message, graphical symbol or an icon, could optionally be displayed on the first display to advise that the first information data set has been duplicated on the second display.

The at least one electronic processor can be configured to control the switching module to remove the first information data set from said second display after determining that the determined gaze direction has been directed at the second display whilst said first information data set was displayed on the second display. Thus, the display control apparatus can check that the driver has viewed the first information data set. A further check could be performed to require that the driver looks at the second display for at least a predetermined time period sufficient to comprehend the first information data set. Alternatively, or in addition, the at least one electronic processor can be configured to control the switching module to remove the first information data set from said second display when the determined gaze direction moves away from the second display. The first information data set could be removed at the same time as, or after the determined gaze direction moves away from the second display. The at least one electronic processor can be configured to control the switching module to remove the first information data set from said second display when the determined gaze direction is in a predefined direction, for example an eyes-forward direction.

The at least one electronic processor can be configured to select said second display from a plurality of displays in dependence on a determined gaze direction of the driver. If the vehicle comprises a third display, the display control apparatus can select either the second or third display for display of the first information data set. The display control apparatus can, for example, select one of the displays in dependence on a determined gaze direction of the driver, for example to display the first information data set on a display most closely aligned with the current gaze direction of the driver. The third display could, for example, be in the form of a head-up display (HUD) or a dashboard-mounted display.

The at least one electronic processor can be configured to receive sensor data from at least one eye tracking sensor; and to determine the gaze direction of vehicle driver in dependence on the received sensor data. Alternatively, the at least one electronic processor can be configured to receive the gaze direction information from an eye tracking apparatus.

The display control apparatus can be configured to record historical data to determine driver behaviour and/or preferences. Based on historical driver behaviour, the display control apparatus can determine if the driver prefers visual or audio output of information. If the driver prefers audio behaviour and the determined gaze direction is not coincident with the first display, the display control apparatus can be configured to output the first information data set in an audio form rather than audio-visual or visual information.

According to a still further aspect of the present invention there is provided an eye tracking apparatus comprising a display control apparatus as described herein.

According to a yet further aspect of the present invention there is provided a vehicle comprising a display control apparatus as described herein. The vehicle can comprise first and second displays. The first and second displays can be spatially separated from each other within the vehicle. The first display can be a console-mounted display, such as a High Level Display Front (HLDF). The second display can be an instrument cluster display or a head up display (HUD).

According to a further aspect of the present invention there is provided a method of dynamically controlling the display of information in a vehicle. The method may comprise displaying a first information data set on a first display and displaying said first information data set on a second display in dependence on a determined gaze direction of the vehicle driver.

The method can comprise displaying the first information data set on said second display when the determined gaze direction is directed at the first display.

The first information data set can be displayed on said second display when the determined gaze direction is directed at the first display for a predetermined period of time; and/or when the determined gaze direction is directed at the first display repeatedly within a predetermined period of time.

The display of said first information data set on said second display can be controlled in dependence on a determined driver workload; and/or a criticality level defined for said first information data set. If the driver workload is determined to be high, the method can comprise inhibiting operation of the switching module; and/or returning the first information data set to said first display.

The method can comprise transferring the first information data set from said first display to said second display; or duplicating the first information data set on said second display.

The method can comprise removing the first information data set from said second display after the determined gaze direction has been directed at the second display. The method could comprise checking that the driver has looked at the second display (whilst the first information data set is displayed thereon) for at least a predetermined time period. The predetermined time period can be specified to ensure that the driver has sufficient to comprehend the first information data set. Alternatively, or in addition, the method can comprise removing the first information data set from said second display when the determined gaze direction moves away from the second display. The first information data set could be removed at the same time as, or after the determined gaze direction moves away from the second display.

The method can comprise selecting said second display from a plurality of displays in dependence on a determined gaze direction of the driver.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying Figures, in which.

DETAILED DESCRIPTION

A display control apparatus 1 for controlling the display of information in accordance with an embodiment of the present invention will now be described. The display control apparatus 1 in the present embodiment is adapted to control the display of one or more information data set INF within an occupant compartment (cabin) 2 of a vehicle 3.

The vehicle 3 is an automobile in the present embodiment, but the invention is applicable to other vehicle types. The information data set INF can be one or more of the following non-exhaustive list of data types: a prevailing speed limit; a vehicle system notification/warning; an infotainment display screen; a satellite navigation instruction; a cellular telephone notification (such as incoming/outgoing call information); and a climate control display.

Figure 1:
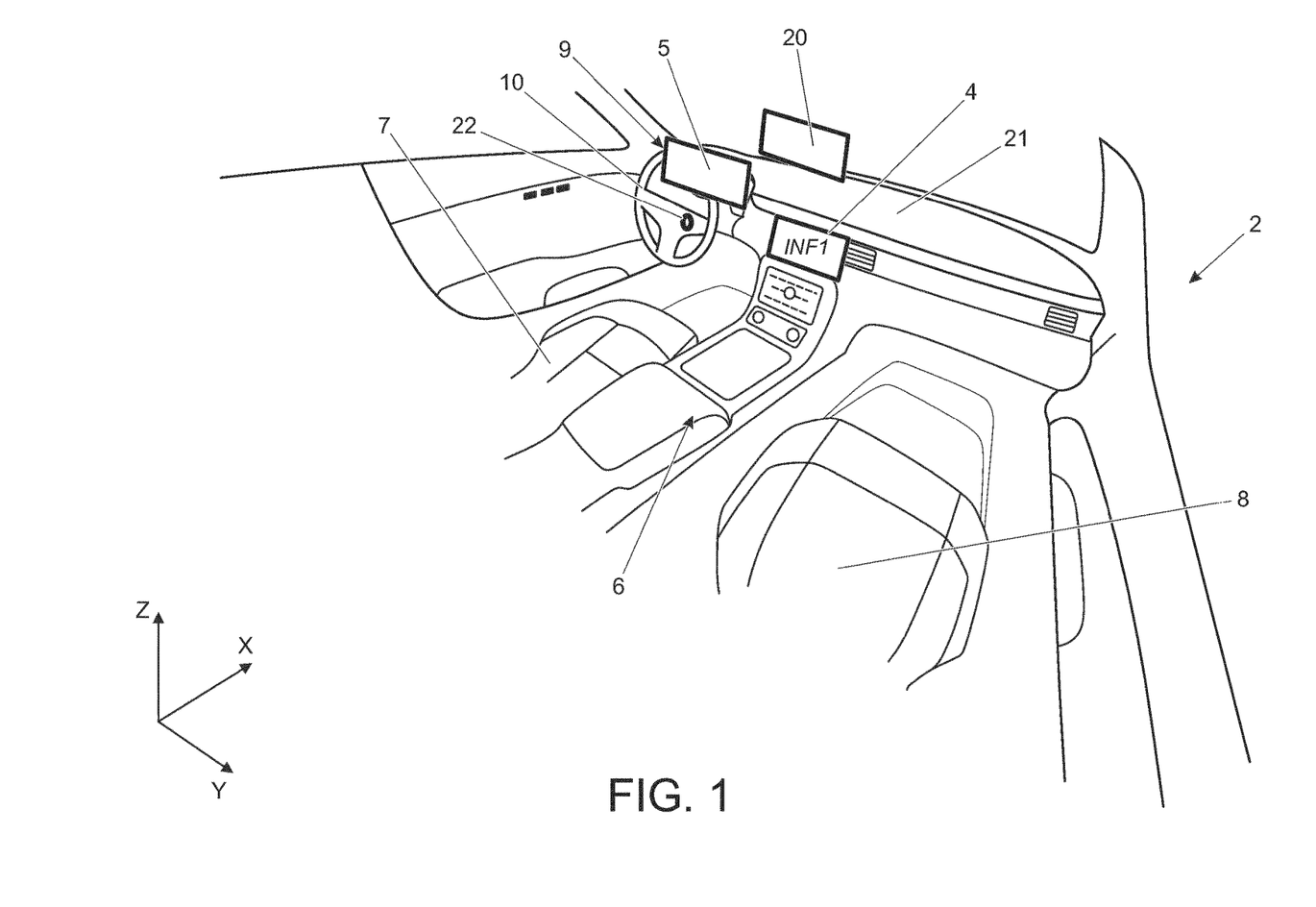
FIG. 1 is a perspective view of a front portion of a vehicle cabin incorporating a display control apparatus according to an embodiment of the present invention.

A perspective interior view of a front portion of the occupant compartment 2 is shown in FIG. 1. The occupant compartment 2 accommodates the vehicle occupants, typically a driver and one or more passengers, and includes various user interfaces for operating vehicle systems. A first display 4 and a second display 5 are provided in the occupant compartment 2 to display information to the driver of the vehicle 3 (and optionally also to the passenger). The first display 4 is a High Level Display Front (HLDF) disposed in a centre console 6 disposed between a driver seat 7 and a passenger seat 8. The second display 5 is disposed in an instrument cluster 9 mounted behind a steering wheel 10. It will be appreciated that the second display 5 is more closely aligned with a line of sight of a driver of the vehicle 3 when they are looking ahead (eyes forward), as would be expected when the vehicle 3 is being driven with due care and attention. The first and second displays 4, 5 are in the form of display screens, for example liquid crystal displays (LCD), in the present embodiment. However, it will be appreciated that one or both of the first and second displays 4, 5 could be a virtual display, for example a head up display (HUD) configured to project a virtual image. In a variant, the first and second displays 4, 5 could refer to first and second display areas within a larger display. In this variant, the display control apparatus 1 in accordance with the present invention can operate to vary the display location of the information data set in said first and second display areas.

The display control apparatus 1 is configured to control the display of information in the first and second displays 4, 5. In particular, the display control apparatus 1 is configured dynamically to control the information displayed in the respective first and second displays 4, 5 in dependence on driver tracking information. The display control apparatus 1 is coupled to driver tracking means in the form of eye tracking apparatus 11 configured to track driver eye movements. The eye tracking apparatus 11 configured to output tracking data D1 identifying where the driver is looking. As described herein, the display control apparatus 1 receives the tracking data D1 and is operative to control the display of information on said first and second displays 4, 5 in dependence on where the driver is looking within the occupant compartment 2. If, for example, the tracking data DAT1 indicates that the driver is repeatedly looking at the first display 4, the display control apparatus 1 operates to display a first information data set INF1 currently displayed on the first display 4 on the second display 5. By displaying the information data set INF1 on the second display 5, the information data set DAT1 can be viewed more readily by the driver, thereby reducing distraction levels. The first information data set INF1 can replace or supplement a second information data set INF2 being display on the second display 5.

Figure 2:
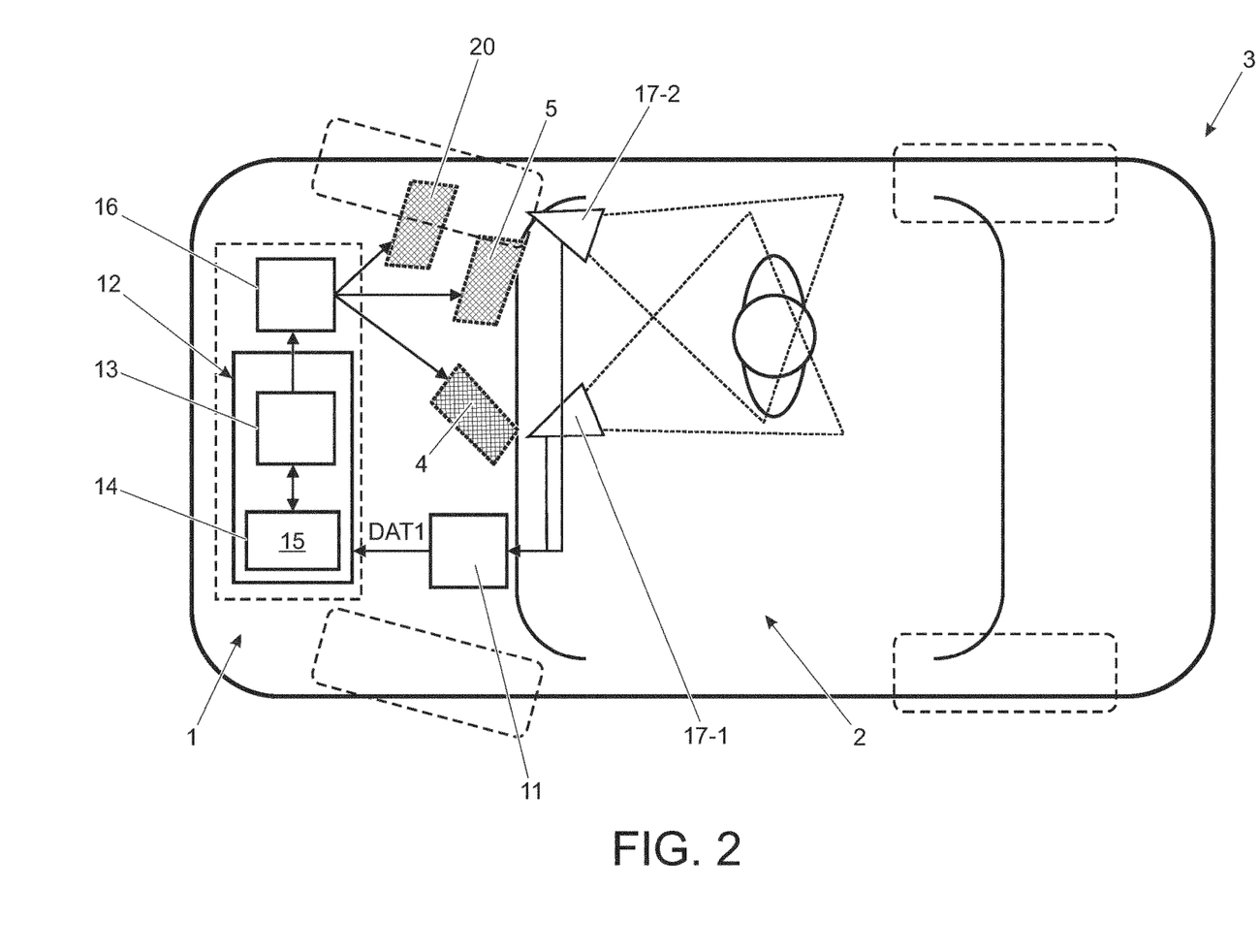
FIG. 2 is a schematic block diagram of a display control apparatus according an embodiment of the present invention.

A schematic representation of the display control apparatus 1 is shown in FIG. 2. The display control apparatus 1 comprises a controller 12 one or more electronic processors 13 (only one is shown for simplicity of explanation) and system memory 14 having computer code 15 stored thereon. The display control apparatus 1 is coupled to the eye tracking apparatus 11 to receive said tracking data DAT1; and to a switching module 16 to control the display of said information data set INF1 on said first display 4 and/or said second display 5. The switching module 16 is operable to display the information data set INF1 on either said first display 4 or said second display 5; or to display the information data set INF1 on both said first and second displays 4, 5 (i.e. to duplicate the information). The display control apparatus 1 generates a switch control signal SIG1 to control operation of the switching module 16, as described herein.

The eye tracking apparatus 11 comprises first and second image sensors 17-1, 17-2 each comprising a driver-facing camera. At least one of said first and second image sensors 17-1, 17-2 can comprise an infra-red (or near infra-red) capability for eye-tracking purposes. In a variant, the first and second image sensors 17-1, 17-2 could detect light at a visible wavelength to determine head position and/or eye gaze. The first and second image sensors 17-1, 17-2 are connected to an image processing unit 19 configured to process the image data to generate tracking data DAT1.

The first image sensor 17-1 is located in a dashboard 21 below a centre-point of the front windshield $W_F$, and the second image sensor 17-2 is located near a bottom corner of the front windshield $W_F$ on the driver side of the vehicle 3. The first and second image sensors 17-1, 17-2 are oriented inwardly into the occupant compartment 2. The first and second image sensors 17-1, 17-2 have respective first and second field of view matrices. In operation, the first and second image sensors 17-1, 17-2 each generate image data which is output to the image processing unit 19. The first and second image sensors 17-1, 17-2 are configured to detect the driver and determine a point of origin in three-dimensional coordinate space based on the position of the driver's head. The orientation of the driver's head can also be determined more accurately to model the gaze direction and/or to determine an approximate eye position for use by an eye-tracking mechanism. The position and orientation of the driver's head can be referred to collectively as the "head pose". The eye-tracking mechanism tracks the driver's eyes so as to determine an angular direction of the driver's target line of sight with respect to a fixed reference (known as "gaze direction").

In the present embodiment, the tracking data DAT1 comprises head pose data and gaze direction data. The tracking data DAT1 is output from the eye tracking apparatus 11 to the display control apparatus 1. The head pose data and the gaze direction data can be combined to form a gaze vector representing a line of sight of the driver.

Since the first display 4 is disposed in the centre console 6, it would be preferable to minimise the time that the driver is looking at the first display 4 whilst driving. The display control apparatus 1 analyses the tracking data DAT1 to determine when the driver is looking at the first display 4. For example, a first area of interest $A_1$ is defined in the system memory 14 to define the location of the first display 4; and a second area of interest $A_2$ is defined in the system memory 14 to define the location of the second display 5. If the tracking data DAT1 indicates that the determined gaze vector intersects the first area of interest $A_1$, the display control apparatus 1 determines that the driver is looking at the first display 4. Similarly, if the tracking data DAT1 indicates that the determined gaze vector intersects the second area of interest $A_2$, the display control apparatus 1 determines that the driver is looking at the second display 5. It will be appreciated that this analysis could be performed by the eye tracking apparatus 11 and output as a signal to the display control apparatus 1.

The display control apparatus 1 is configured to generate the switch control signal SIG1 to control operation of the switching module 16 in dependence on the tracking data DAT1. In the above example, the switch control signal SIG1 requests that the switching module 16 switches display of the information data set INF1 from said first display 4 to said second display 5 when the tracking data DAT1 identifies the determined gaze vector as intersecting the first area of interest $A_1$. A modified switch control signal SIG1 is subsequently generated to request that the switching module 16 returns display of the information data set INF1 to said first display 4. The display control apparatus 1 can output the modified switch control signal SIG1 after a predetermined period of time has elapsed, or in dependence on the tracking data DAT1. For example, if the display control apparatus 1 determines that the driver has looked at the second display 5, the switching module 16 can be controlled to return the information data set INF1 to the first display 4. The display control apparatus 1 utilises the gaze detection technology to manage the content displayed in the various screens. The system can be used with or without a vehicle initiated dialogue system.

Figure 3:
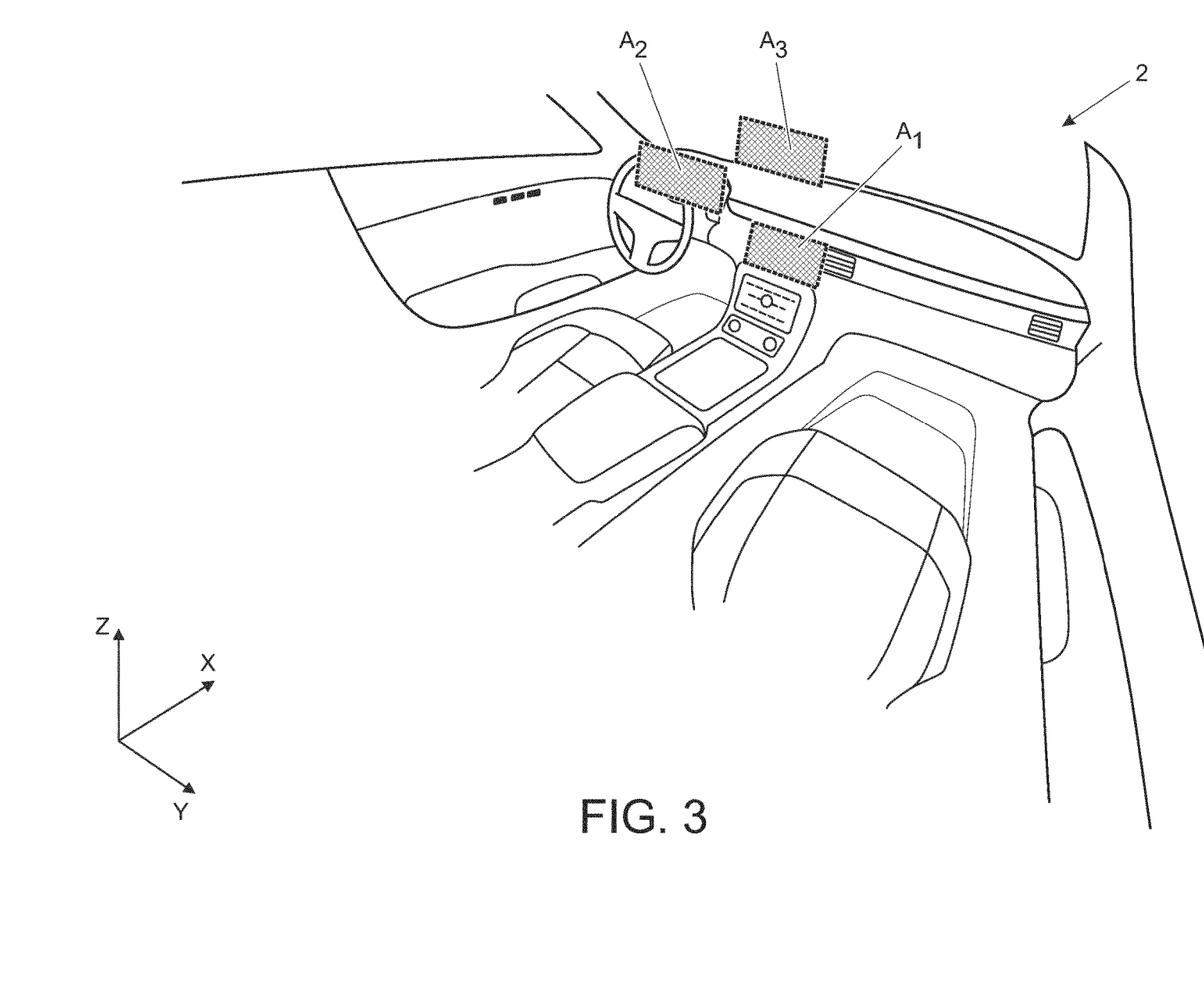
FIG. 3 is a perspective view of the vehicle cabin illustrating the operation of the display control apparatus.

It will be appreciated that the occupant compartment 2 could be provided with more than two displays. For example, the occupant compartment 2 could comprise at least a third display 20. As shown in FIG. 3, the third display 20 could be in the form of a head-up display (HUD) for projecting a virtual image. Alternatively, or in addition, the third display 20 could be in the form of a display screen mounted to the dashboard 21. Alternatively, or in addition, the third display 20 could be a projection onto the dashboard 21 from a projector (not shown). The display control apparatus 1 could control the switching module 16 in dependence on the tracking data DAT1 determined by the eye tracking apparatus 11. For example, the switching module 16 could be controlled such that the information data set INF1 is displayed at least on the display 4, 5, 20 coincident with, or most closely aligned with the determined gaze vector.

The display control apparatus 1 can be configured to control the dynamic display of the information data set INF1 in dependence on a determined criticality of the information. For example, the information data set INF1 can be selected from a plurality of information data sets $INF_{1-n}$ each having a predefined criticality setting (for example high, medium and low criticality settings). The display control apparatus 1 can be configured to control switching of each information data set $INF_{1-n}$ in dependence on the predefined criticality setting. For example, only an information data set $INF_{1-n}$ having a high criticality setting (for example a speed limit notification or a warning signal) may be displayed on a head-up display (HUD), whereas an information data set $INF_{1-n}$ having a medium criticality setting (for example an infotainment display screen or a cellular telephone notification) may be displayed on the second display 5 in the instrument cluster 9. Furthermore, the display control apparatus 1 can control the period of time for which the information data set $INF_{1-n}$ is displayed in dependence on the predefined criticality setting. For example, an information data set $INF_{1-n}$ having a high criticality setting could be displayed for a relatively long time period (for example 20 seconds), whereas an information data set $INF_{1-n}$ having a medium criticality would be displayed for a relatively short time period (for example 10 seconds). Alternatively, or in addition, only some of the information data sets $INF_{1-n}$ may be switchable between said displays 4, 5, 20. For example, the information data sets $INF_{1-n}$ can each be defined as being fixed (i.e. non-switchable) or switchable. Those information data sets $INF_{1-n}$ defined as being fixed are not switched between the displays 4, 5, 20.

The display control apparatus 1 could optionally also be configured to control additional output devices, such as audio devices and/or haptic devices. For example, the display control apparatus 1 could selectively output an audio version of an information data set INF1 through a vehicle audio system. This control strategy could be implemented if, for example, the tracking data DAT1 determines that the user is repeatedly looking at the first display 4.

The information data set INF1 could be switched to an alternate one of said first, second and third displays 4, 5, 20 for a predetermined time period, for example 5 seconds. Alternatively, or in addition, the information data set INF1 can be displayed on the second display 5 until the tracking data DAT1 generated by the eye tracking apparatus 11 indicates that the driver has looked at the second display 5. Once the display control apparatus 1 determines that the driver has looked at the second display 5, the information data set INF1 can be removed from the second display 5. The display control apparatus 1 could also be coupled to an input device 22, such as a button or switch provided on the steering wheel 10, to allow the driver to acknowledge that they have seen the information data set INF1. By way of example, the display control apparatus 1 can operate to switch the information data set INF1 from the first display 4 to the second display 5 and, in dependence of actuation of the input device 22, switch the paste it back to the first display 4. The display control apparatus 1 can measure the time elapsed before the driver actuates the input device 22 and use this to determine an average time required for a particular driver to view the information data set INF1 once it has been switched to the second display 5.

The display control apparatus 1 could be configured to learn preferences and/or behaviour patterns of a particular driver. For example, the display control apparatus 1 could learn which one of a plurality of displays 4, 5, 20 is looked at most frequently by the driver. The display control apparatus 1 can control the switching module 16 such that the information data set INF1 is displayed on at least the identified display 4, 5, 20 looked at most frequently by the driver.

The display control apparatus 1 could optionally be configured to determine a driver workload or to receive a driver workload signal. The driver workload can be determined with reference to a vehicle control inputs, such as steering angle, and/or dynamic parameters, such as vehicle speed/acceleration. Data received from the vehicle sensors, such as traffic monitoring sensors, can also be used to determine driver workload. The display control apparatus 1 could be configured to inhibit switching of the information data set INF1 between the first and second displays 4, 5 when the driver workload is determined to be high. Alternatively, or in addition, the display control apparatus 1 can modify the time period for which the information data set INF1 is displayed on the second display 5 when it is switched from the first display 4.

The display control apparatus 1 can optionally be configured to monitor how the driver performs a particular task (or set of tasks), for example to learn how much time the user requires to perform a task and how often the driver looks at the first display 4 whilst carrying out that tasks. The display control apparatus 1 may monitor driver behaviour in different situations, for example based on the current workload of the driver or in particular driving conditions. The display control apparatus 1 can be configured to modify how the switching module 16 is controlled in dependence on the historic driver behaviour.

The operation of the display control apparatus 1 while the driver is operating an infotainment system will now be described. The driver operates the infotainment system via a graphical interface displayed on the first display 4, for example to select a particular radio station or a track from a playlist. The display control apparatus 1 determines that the driver workload is high since the eye tracking apparatus 11 indicates that the driver is repeatedly looking at the first display 4. The display control apparatus 1 outputs the switching control signal SIG1 to control the switching module 16 to move or duplicate the information data set INF1 to the second display 5 or the third display 20, thereby helping to reduce the driver distraction. The display control apparatus 1 can control the switching module 16 to return the information data set INF1 to the first display 4 if the eye tracking apparatus 11 determines that the driver is looking at the first display 4.

The display control apparatus 1 can also operate to ensure that the driver is made aware of critical information, such as a vehicle fault or warning (such as a lane departure warning). In this scenario, the information data set INF1 can be in the form of a system alert. The default setting is to display the system alert in the second display 5 in the instrument cluster. However, the display control apparatus 1 can control the switching module 16 such that the system alert is moved to another display in the line of sight of the driver as determined by the eye tracking apparatus 11. For example, the system alert could be output to the head-up display (HUD).

The content of the information data set INF1 can be modified depending on the display in which it is to be displayed. For example, the information data set INF1 could be displayed in the first display 4 with an icon accompanied with a text description. When the information data set INF1 is transferred to the second display 5 in the instrument cluster, it can be in the form of an icon ("as present"). Moreover, when transferred to the third display 20, the information data set INF1 can be displayed as a text message (for example "Brake Fault").

The display control apparatus 1 can be configured to determine the criticality of the information data set INF1 and to assess the attention required by the driver. The display control apparatus 1 can implement a learning strategy and implement one or more control functions progressively. For example, at least initially the display control apparatus 1 may not transmit the information data set INF1 across all of the available displays 4, 5, 20 (e.g. general navigation commands). Rather, the system will initially only process the tasks requiring higher attention tasks e.g. radio setting, warning, address entry etc. However, if the system detects that the driver is continuously giving attention to a navigation aid displayed in the first display 4 (for example having to look at the second display 5 repeatedly, say 3 or 4 glances, to check information), the display control apparatus 1 can be configured to recognise a problem and to prioritise that task. The switching module 16 can be controlled such that the display information data set INF1 is output to either the second or third display 4, 20 which is more convenient for the driver and, thereby helps to reduce driver distraction.

It will be appreciated that various changes and modifications can be made to the invention described herein without departing from the scope of the present application. The display control apparatus has been described with particular reference to a display screen or a head up display (HUD). However, it will be appreciated that the invention is not limited in this respect. For example, the display control apparatus could operate to control output of the information data set to an on-board projection system; and/or a connected consumer electronic device (such as a cellular telephone, personal computer or tablet computer) to display the information anywhere in vehicle.

The invention claimed is:

1. A display control apparatus for controlling the display of information in a vehicle, the display control apparatus comprising:
   a controller comprising at least one electronic processor configured to control first and second displays,
      wherein the at least one electronic processor is configured to control a switching module to cause a first information data set displayed on the first display to be displayed on the second display in dependence on identifying that a determined gaze direction of a driver of the vehicle is directed at the first display,
   wherein the at least one electronic processor is configured to select said second display from a plurality of displays in dependence on the determined gaze direction.

2. The display control apparatus as claimed in claim 1, wherein the at least one electronic processor is configured to control the switching module to display the first information data set on the second display when the determined gaze direction is directed at the first display for a predetermined period of time, and/or when the determined gaze direction is directed at the first display repeatedly within a predetermined period of time.

3. The display control apparatus as claimed in claim 1, wherein the at least one electronic processor is configured to control the switching module in dependence on one of: priority of information, driver preferences, a determined driver workload, and a criticality level defined for the first information data set.

4. The display control apparatus as claimed in claim 1, wherein the at least one electronic processor is configured to transfer the first information data set displayed on the first display from the first display to the second display, or to duplicate the first information data set displayed on the first display on the second display.

5. The display control apparatus as claimed in claim 1, wherein the at least one electronic processor is configured to control the switching module to remove the first information data set from the second display after determining that the determined gaze direction has been directed at the second display for at least a predetermined time period.

6. The display control apparatus as claimed in claim 1, wherein the at least one electronic processor is configured to:
   receive sensor data from at least one eye tracking sensor; and
   determine the gaze direction in dependence on the received sensor data.

7. The display control apparatus as claimed in claim 1, wherein the at least one electronic processor is configured to receive information about the gaze direction from an eye tracking apparatus.

8. An eye tracking apparatus comprising the display control apparatus as claimed in claim 1.

9. A vehicle comprising the display control apparatus as claimed in claim 1.

10. A method of dynamically controlling the display of information in a vehicle, the method comprising:
    displaying a first information data set on a first display;
    displaying the first information data set on a second display in dependence on identifying that a determined gaze direction of a driver of the vehicle is directed at the first display; and
    selecting said second display from a plurality of displays in dependence on the determined gaze direction.

11. The method as claimed in claim 10, wherein the displaying the first information data set on the second display is performed when the determined gaze direction is directed at the first display for a predetermined period of time and/or repeatedly within the predetermined period of time.

12. The method as claimed in claim 10, further comprising controlling the display of the first information data set on the second display in dependence on a determined driver workload and/or a criticality level defined for the first information data set.

13. The method as claimed in claim 10, further comprising transferring the first information data set from the first display to the second display, or duplicating the first information data set on the second display.

14. The method as claimed in claim 10, further comprising removing the first information data set from the second display after the determined gaze direction has been directed at the second display for at least a predetermined time period.

15. The display control apparatus as claimed in claim 3, wherein the at least one electronic processor is configured to control an audio device and/or a haptic device to selectively output in an audio form and/or in a haptic form in dependence on the determined gaze direction and optionally on one or more preferences of the vehicle driver.

16. A control apparatus for controlling the display of information in a vehicle, the control apparatus comprising:

a controller comprising at least one electronic processor configured to control a switching module to cause a first information data set displayed on a first display to be selectively output in an audio form to an audio device and/or haptic form to a haptic device in dependence on a determined gaze direction of a driver of the vehicle.

17. A vehicle comprising the control apparatus of claim 16.

* * * * *